3,246,992
WHIPPING COMPOSITIONS AND PROCESS FOR PRODUCING SAME
Peter P. Noznick and Charles W. Tatter, Chicago, Ill., assignors, by mesne assignments, to General Foods Corporation, White Plains, N.Y., a corporation of Delaware
No Drawing. Filed Dec. 29, 1955, Ser. No. 556,062
20 Claims. (Cl. 99—139)

The present invention relates to a powder product which can be reconstituted with water and whipped by hand, or by a conventional beater such as a "Mixmaster," into a light foam in a few minutes, e.g., three to five minutes, the foam being stable for days, possessing desirable stiffness and being characterized by forming peaks as distinguished from having rounded or mound-like shapes.

The whipped product has a structure and properties which make it suitable for many of the same uses as whipped cream, as well as for icings or cream fillings.

An object of this invention is to provide a reconstitutable powder which, after adding the water, does not have to be aged overnight as customary but, on the contrary, may be immediately whipped and form the stable desirable whip in a matter of a few minutes. Furthermore, the reconstituted powder may be so whipped at normal room temperature and does not require the usual pre-chilling treatment associated with whipping of reconstituted cream.

The product comprises essentially a mixture of powders and is prepared as follows:

EXAMPLE 1

*Spray dried product No. 1*

| | Percent |
|---|---|
| Fat being hydrogenated cottonseed oil containing 10% propylene glycol monostearate and 2.2% monoglyceride esters of hydrogenated cottonseed oil as emulsifiers | 53.1 |
| Cane sugar | 30.80 |
| Sodium caseinate | 10.65 |
| Gum acacia | 5.31 |

Water in amount to form a spray driable, aqueous mixture having a pH of about 5.75 and containing about 45% solids.

The mixture is pasteurized at 145° F. for thirty minutes and thereafter the mixture, at a temperature of about 145° F., is homogenized at about 500 pounds p.s.i. and spray dried at an inlet air temperature of about 300° F. and an outlet air temperature of about 180° F. It was found that the fat globules were coated with the other ingredients, the gum and caseinate being desirable coating agents to assure a water-reconstitutable mass of fat globules. The globules have a size of about 7 microns, which is highly suitable for whipping.

*Spray dried product No. 2*

83.4% gum acacia and 16.6% cream of tartar are mixed with sufficient water to form a 35% solids dispersion mixture which will be homogenizable and spray driable. The pH of the aqueous mix is about 3.55 and it is now pasteurized, as described above, in No. 1, and homogenized at about 1000 pounds p.s.i. and spray dried, as also indicated above in No. 1. The homogenizing here is preferable to break up any large masses present and better distribute the gum.

*The final mix*

The spray dried products, namely, 66.15% of No. 1 and 2.50% of No. 2, are mixed together with about 29.4% cane sugar and about 1.95% rice flour in a conventional batch mixer.

To this powder may be added a conventional powder flavor, e.g., vanilla, defatted cocoa, orange, lemon, caramel, maple, raspberry, etc. Also, other flavor materials, such as cheese powders, notably, blue, roquefort, cheddar, cottage, etc., preferably about 23% by weight and normally in the range of about 10% to 30% by weight, depending on the flavor strength desired, together with traces of spices to make the cheese flavor in the final product, have enhanced palatability.

All percentages in the foregoing example are by weight.

*The whip*

About 5 ounces of the above mixture, either containing or without the flavor just mentioned above, are admixed with about 200 cc. (6 to 7 ounces) of water at normal temperature.

The water-reconstituted powder is now ready for whipping and is whipped at room temperature in a conventional beater, such as a "Mixmaster" and in about four minutes a stiff, light foam is produced having peaks and a lasting stability for at least twenty-four hours or more. This aerated product is suitable for the various uses of a whipped cream and also provides a desirable whipped icing or whipped cream filling, as well as frostings and serves other confectionery purposes, such as a filling between layers of cakes.

The above example was repeated with equivalent results with vanilla flavoring included.

The sugar in the above has the principal function of sweetening. Dextrose, as well as corn syrup solids, can also be used in the above example, in each instance together with or in place of cane sugar. The amount of such sweetenings or mixtures thereof in each of the dry mix powders of the examples herein may vary between about 10% to 60% by weight, preferably being 20% to 50% on a dry basis.

The rice flour is, in effect, a drying agent in that it decreases wetness in the powder. Other flours, such as soy, wheat, or rye flour, or wheat or corn starch, are successfully used in the foregoing example together with or in place of rice flour. The amount of such flours or mixtures thereof in each of the examples herein may vary between about 1% to 5% by weight.

Instead of all or a part of the fat used in the above example, namely, the cottonseed oil, hydrogenated vegetable oils, e.g., soy, peanut, sesame and hydrogenated animal oils, e.g., lard and butter, can be used. The fat or fat mixture in each of the examples herein may be used in amount of about 30% to 75% by weight, depending upon the type of product desired.

Likewise, instead of the emulsifier recited in the foregoing example, we use, either alone or admixed with the said emulsifier, glycerol esters, e.g., mono and di-glycerol esters of the above-mentioned vegetable fats; tartaric-glycerol esters of fatty acids of said above fats, and polyoxyethylene derivatives of sorbitan monostearate, and similar polyoxyethylene derivatives of sorbitan esters of other higher fatty acids, e.g., propylene glycol monostearate, as well as the hydrogenated fatty acids derived from the above-mentioned fats. The amount of the emulsifier will vary between 0.25% to 12.5% in each example herein.

Other water-soluble or water-dispersible proteinaceous materials can be used in place of all or a part of the caseinate in the amount and in the range equivalent to that just recited, e.g., soy protein obtained by water extraction of soy bean meal and called "NV Protein Special" by Gunther Products, Inc., of Galesburg, Illinois, and which has an analysis of substantially protein (NX 625) 86%, ash 7%, nitrogen-free extract 2%, moisture 5%, this analysis being made by The Laboratory of Vitamin Technology, Chicago, Illinois. In product No. 1 the caseinate, or the proteinaceous materials just described and mixtures of the same are used in amount between about 7% and 12% in each of the examples herein, and preferably 10.65%, as stated.

Also, in product No. 1, as well as in No. 2, instead of the gum acacia, other carbohydrate gums in combination with gum acacia can be used. For instance, about 3% of gum tragacanth based on the total weight of the gum is admixed with the gum acacia. Usually the gum tragacanth is used in amount of about 2% to 4% of the total weight of the gum content in each example herein, and preferably about 3%. The total gum in product No. 1 will vary between about 2% to 10% and the total gum in product No. 2 between about 80% to 95% in each of the examples herein.

In No. 2 the cream of tartar will vary between about 5% and 20%. Tartaric acid, acetic acid, citric acid and mono salts of saccharic acid can be used in equivalent amounts as recited above in No. 2, and are also used in equivalent amounts in the range which is recited in each of the examples to replace all or a part of the cream of tartar, i.e., mixtures of these various compounds may be employed.

In the final powder, the amount of No. 1 will vary between about 50% to 75%, No. 2 between about 1% to 5%, the sweetener between about 10% to 60%, and the flour between about 1% to 5% by weight on a dry basis.

The amount of flavors added will be as desired to impart the flavor or they may be omitted. The same is true of edible colorings.

It is a critical feature of this invention that No. 1 has protein and carbohydrate gum while No. 2 contains cream of tartar or other acids and carbohydrate gum or gums which are dried together.

In preparing No. 1, the homogenization pressure is varied between about 300 to 600 pounds p.s.i. and is an important step in order to attain the preferred particle size of fat, namely, between about 6 and 8 microns and not substantially outside of the range of about 4 to 10 microns before drying. When below this range, the ultimate powder does not whip or peak, and above the range, it forms only a dispersion in which the emulsion breaks, i.e., "oils off." If the fat globules are too finely dispersed, as explained, e.g., in the range of 2 microns or smaller, the resulting reconstituted mix will fail to whip adequately, i.e., will not form the firm, stiff peak structure nor whip up to the required volume or have the desired stability and volume.

In No. 2 the homogenization pressure varies between about 400 and 2500 pounds p.s.i.

In No. 2 above, also, the pH of the aqueous emulsion before drying varies permissibly from about 3.5 to 4.2.

In No. 1 above, the pH of the aqueous emulsion before drying permissibly varies from about 5.5 to 6.0.

The pH of the final water-reconstituted powder product, at the end of the whipping, i.e., of the whip, is about 5.1 and in the range of 4.9 to 5.5.

The water in the reconstituted product is about 30% to 65% of the total weight of the water and powder.

In No. 1 above, there is added just enough sodium caseinate or soya protein or other edible protein so that when it is coagulated by a lower pH, it causes a release of the fat globules, enabling them to form a characteristic structure of a whipped fat form. The caseinate or proteinaceous material initially acts as a coating agent for the dispersed fat globules. The gum also acts as a coating agent and by reason of its strongly negative charge, will form a complex with the proteinaceous caseinate. Thus, any sudden or abrupt destabilization of the coating around the individual fat globules of the reconstituted fat particles is prevented.

By spray drying in preparing No. 2, containing water and either the cream of tartar or one of the equivalent materials recited above, or mixtures of the same, with a hydratable gum, e.g., gum acacia or a mixture of gum acacia and gum tragacanth, as recited above and in No. 2, which will not coagulate at the pHs, e.g., 3.55, normally present in an aqueous solution, for example, of cream of tartar, the resulting powder has the tartaric acid tied up, i.e., partially bound, so that when No. 2 is added to No. 1, in the final powder mix, upon reconstitution with water, the relatively slow rate of hydration of No. 2 only gradually releases the tartaric acid and it is only toward the end of the whipping period that significant amounts are released, thereby rendering it available at the tail end of the whipping action to stiffen and peak the whip. The same results are observed when equivalents of the cream of tartar or tartaric acid are used, or various mixtures of these compounds.

As explained, an important feature of this invention is the drying together in No. 1 of the gum and casinate or other proteinaceous material.

Also, as explained, an equally important feature is the drying together of the gum or mixture of gums, for example, the tartaric acid in No. 2, or other acid, such as gluconic or saccharic acid or citric acid, and others, as recited, or mixtures of the same. Thus, in the final mix, when reconstituted as in the above example, the release of the tartaric acid or other acid is retarded and controlled as the whip rises and this acts to stiffen and peak the same.

EXAMPLE 2

By combining powder No. 1 and powder No. 2 with water, as in Example 1, without the addition of added cane sugar, or rice flour, a mixture is obtained which, when whipped, resembles whipped cream in appearance, taste, consistency and volume.

Power No. 1 may vary from 90% to 98%, preferably 95.5% by weight, and powder No. 2 may vary from 2% to 10%, preferably 4.5% by weight of the final mixture.

EXAMPLE 3

This is similar to Example 2 except that cane sugar is added to the spray dried mixture of No. 1 and No. 2 in the amount stated in Example 1.

EXAMPLE 4

This is similar to Example 2 except that rice flour is added to the spray dried mixture of No. 1 and No. 2 in the amount stated in Example 1.

EXAMPLE 5

This is the same as Example 2 except that the procedure is modified by substituting the Gunther soy protein, as mentioned above, for all of the caseinate in No. 1. That is, instead of 10.65% caseinate, the same amount of the soy bean protein is used. The gum gum acacia is reduced to 3.1% and the cane sugar is increased to 33.0% of No. 1.

The pH of the aqueous emulsion before drying is 6.7 and the pH of the final whip is 5.0.

The pH of the emulsion may vary between 5.9 and 6.7, while the pH range of the whip may vary between 4.5 to 6.0.

EXAMPLE 5a

This is identical with Example 5 except that about 50% of the soy protein and about 50% of the caseinate are used. The pH of the final whip was 5.15 and the pH of the emulsion was 6.18.

EXAMPLE 6

This is like Example 2 except that milk solids, namely, skim milk solids, are substituted for the whole of the caseinate or the protein in No. 1 of Example 5 in amount of about 28% by weight. The sugar content is reduced to about 13% by weight in No. 1.

The pH of the emulsion and of the final whip are the same as in Example 1, namely, about pH 5.1 for the whip and about 5.7 for the emulsion.

EXAMPLE 6a

This is the same as Example 6 except that about 50% of the Gunther protein and about 50% of the milk solids were used.

EXAMPLE 7

This example is like Example 2 except that in making up No. 1 there is employed about 50% of the fat, 30% cane sugar, 10% sodium caseinate and 10% skim milk solids, the latter being used instead of the gum acacia.

This powder, when combined with No. 2 and reconstituted with water, gives a final whip with a pH of 5.15. A preferable range of pH is 5.0 to 5.4.

In making up the above product about 92.5% of this No. 1 powder and 7.5% of the No. 2 powder of Example 1 are mixed. The range of the mixture may vary between about 90% and 95% of powder No. 1 and about 5% to 10% of powder No. 2.

The range of skim milk solids may vary between 2% and 12% in Example 7 and in Example 7a the amount of skim milk solids substituted for the caseinate or Gunther protein may vary over a wide range from the equal percent mixture described in Example 7a.

EXAMPLE 7a

In this example equal parts of the skim milk solids and sodium caseinate or Gunther protein are used to make a total of about 20% and the gum acacia is omitted from powder No. 1. Otherwise, the products of this example are the same as in Example 7.

EXAMPLE 8

This example relates to forming a 10% fat ice cream. A whip powder mixture is prepared as in any of the previous examples, and by way of illustration, has a total solids content of about 39.732%, comprising 20% solids of Example 2, combined with 10% sugar, 9.6% skim milk solids, 0.12% carboxymethyl cellulose (stabilizer), and 0.012% "Gelcarin" (stabilizer, sometimes called "carrageenin," a seaweed product being Irish moss extract), the balance being water to 100%.

The product of Example 2 used in Example 8, namely, the mixture of powders, comprises approximately 96.5% of No. 1 and 3.5% of No. 2 in this example.

The various solid ingredients in amount of about 39% are mixed and there is then added about 61% water by weight of the total mixture. The mixture is beaten in the usual manner, which causes the mix to thicken and aerate. That is, the overrun is increased, for example, in the mixer, which may be the usual type of conventional domestic "Mixmaster" or ice cream plant mixing and freezing equipment. The whip thus formed is put in a freezing tray and placed in the freezing compartment of the ordinary household electric refrigerator. Flour or other stiffener is not needed since the rigidity of the product is maintained by reason of the ice crystals produced. The sugar employed is only for taste and may or may not be used. Most ice cream or frozen dessert mixes require two-stage mixing, namely, first, a beating whereupon the beaten mix is put in the freezing compartment and thereafter when this mix becomes slushy, it is taken out and beaten again. It is the second stage of this conventional and objectionable operation which is eliminated by the present invention.

EXAMPLE 8a

Instead of adding water in Example 8, skim milk is added so as to obtain the necessary milk solids and, at the same time, reconstitute the mixture to a viscosity at which it can be readily mixed in the usual household mixing equipment or ice cream plant mixing machinery.

Alternatively, whole milk can be used in place of skim milk.

We have indicated above the preferred pH for the final reconstituted whip and, as a result of our study of numerous examples, we believe the whip is best when it has a pH of about 5.0 to 5.1, but suitable whips are obtained within the PH range of 4.8 to 5.5, using the various examples referred to above.

EXAMPLE 9

Example 1 was repeated except that no cream of tartar was used, i.e., No. 2 consisting only of the spray dried gum. The whip so obtained was wet or slick and while this type of body is useful, for instance, as a filling between layers of cake or possibly for a marshmallow-type topping over frozen desserts and gingerbread cakes, it does not have the body of the products prepared with cream of tartar or equivalent material, and is not preferred.

EXAMPLE 10

This example was similar to Example 1 but, in preparing No. 2, only about half the amount of cream of tartar was employed, namely, 90% gum and 10% cream of tartar by weight. This product was considerably improved over the product of Example 9 insofar as obtaining the desirable body was concerned.

In the various examples preferred materials are set forth but it is to be understood that these preferred ingredients may be replaced in whole or in part by mixtures of the various equivalents, as indicated.

In preparing spray dried product No. 1 in each of the examples recited above, the amount of water added may be varied so as to produce an aqueous, homogenizable mixture containing between about 40% to 50% solids by weight.

In preparing spray dried product No. 2 in each of the examples recited above, the amount of water added may be varied so as to produce an aqueous, homogenizable mixture containing between about 34% to 45% solids by weight.

We claim:

1. An edible composition for use with water to make a whip comprising (1) the spray dried mixture of an edible fat, a sweetner, a water-soluble protein and a water-soluble gum, and (2) the spray dried mixture of a water-soluble gum and an acidic stiffening agent.

2. A product according to claim 1 containing additional sweetener.

3. A product according to claim 1 containing a wetness decreasing agent.

4. A product according to claim 1 wherein there is included additional sweetener and a wetness decreasing agent.

5. A product according to claim 1 wherein there is included an emulsifier.

6. A product according to claim 5 wherein the edible fat is selected from the group consisting of peanut oil, soy bean oil, cottonseed oil, sesame oil, lard and butter and mixtures of the same; wherein the emulsifier is selected from the group consisting of glycerol mono esters of the above-mentioned fats, propylene glycol monostearate, polyoxyethylene derivatives of sorbitan stearates, and glycerol esters of fatty acids derived from the above fats and mixtures of the same; wherein the sweetener is selected from the group consisting of cane sugar, corn syrup solids and dextrose and mixtures thereof; wherein the soluble gum is selected from the group consisting of gum acacia and gum tragacanth and mixtures thereof; wherein the protein is selected from the group consisting of sodium caseinate and soy protein; the moisture decreasing agent is selected from the group consisting of soy flour, rice flour, wheat flour and rye flour and wheat starch and corn starch, and the stiffening agent is selected from the group consisting of tartaric acid, cream of tartar, gluconic acid, citric acid and saccharic acid.

7. A product according to claim 6 wherein said fats are hydrogenated.

8. The process comprising spray drying a mixture of edible fat, emulsifier, sweetener, water-soluble protein and water-soluble gum; spray drying a mixture of water-soluble gum and an acidic stiffening agent, and mixing the two spray dried products.

9. The process comprising spray drying a mixture of edible fat, emulsifier, sweetner, water-soluble protein and water-soluble gum; spray drying a mixture of water-soluble gum and an acidic stiffening agent, and mixing the two spray dried products with an additional sweetener as a powder.

10. The process of making an edible product comprising spray drying a mixture of edible fat, emulsifier, sweetener, water-soluble protein and water-soluble gum; spray drying a mixture of water-soluble gum and an acidic stiffening agent, and mixing the two spray dried products with a moisture decreasing agent as a powder.

11. The process of making an edible product comprising spray drying a mixture of edible fat, emulsifier, sweetener, water-soluble protein and water-soluble gum; spray drying a mixture of water-soluble gum and an acidic stiffening agent, and mixing the two spray dried products with an additional sweetener as a powder and a moisture decreasing agent as a powder.

12. The method according to claim 11 wherein at least the first-mentioned mixture is homogenized before spray drying.

13. The method according to claim 11 wherein at least the first-mentioned mixture is homogenized before spray drying at a pressure between about 300 and 600 pounds p.s.i.

14. The method according to claim 13 wherein the dry powder mixture is reconstituted with water at normal temperature.

15. The method according to claim 14 wherein the reconstituted mixture is whipped.

16. An edible composition for use with water to make a whip comprising (1) the spray dried mixture of an edible fat, a sweetener, a water-soluble protein and milk solids, and (2) the spray dried mixture of a water-soluble gum and an acidic stiffening agent.

17. An edible composition for use with water to make a frozen dessert comprising (1) the spray dried mixture of an edible fat, a sweetener, a water-soluble protein and a water-soluble gum, and (2) the spray dried mixture of a water-soluble gum and an acidic stiffening agent, sugar, milk solids and stabilizer.

18. An edible composition for use with water to make a frozen dessert comprising (1) the spray dried mixture of an edible fat, a sweetener, a water-soluble protein and milk solids, and (2) the spray dried mixture of a water-soluble gum and an acidic stiffening agent, sugar, milk solids and stabilizer.

19. A product according to claim 1 including a flavor.

20. A product according to claim 19 where cheese constitutes the flavor.

References Cited by the Examiner

UNITED STATES PATENTS

| | | | |
|---|---|---|---|
| 2,271,654 | 2/1942 | Littlefield | 99—139 |
| 2,588,419 | 3/1952 | Sevall et al. | 99—114 |
| 2,619,423 | 11/1952 | Diamond | 99—139 X |

FOREIGN PATENTS

| | | |
|---|---|---|
| 607,810 | 9/1948 | Great Britain. |
| 658,854 | 10/1951 | Great Britain. |

A. LOUIS MONACELL, *Primary Examiner.*

TOBIAS E. LEVOW, ABRAHAM H. WINKELSTEIN,
*Examiners.*